Aug. 6, 1935.   H. R. TEAR   2,010,165
LUBRICATING DEVICE
Filed May 10, 1932
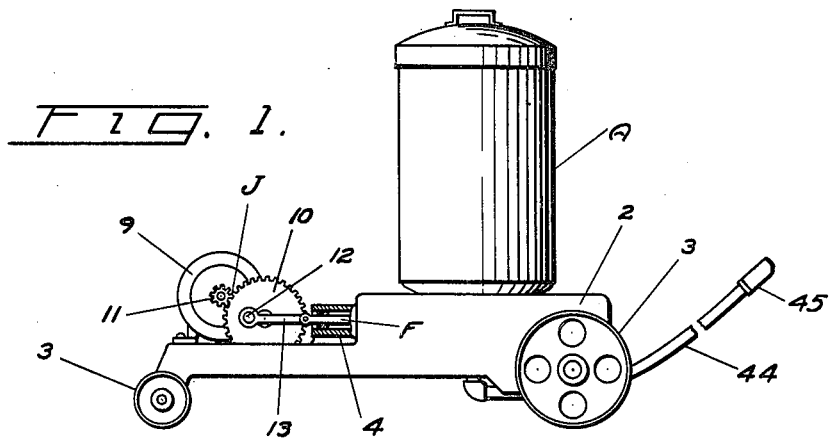
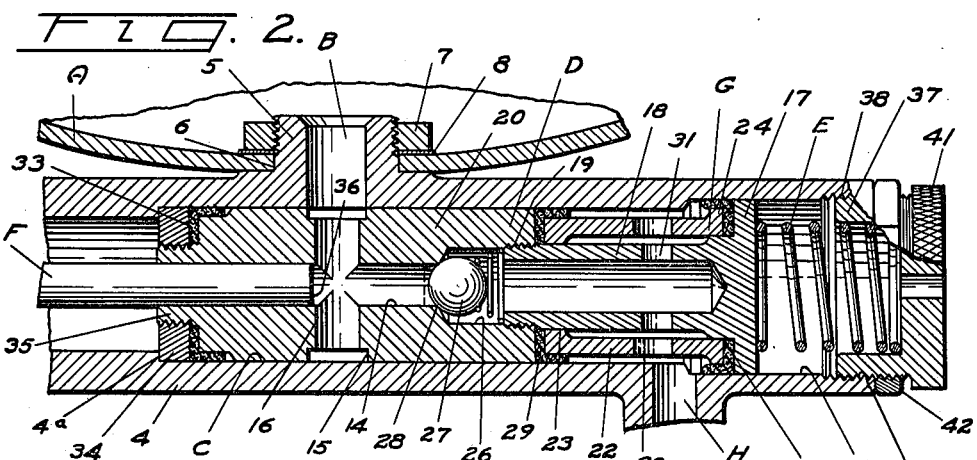
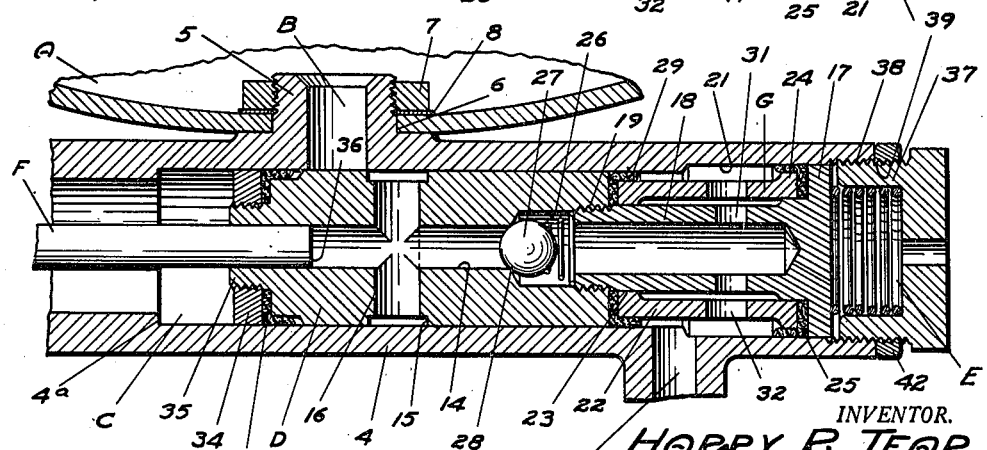
INVENTOR.
HARRY R. TEAR
BY
John A. Watson
ATTORNEY.

Patented Aug. 6, 1935

2,010,165

UNITED STATES PATENT OFFICE 2,010,165

LUBRICATING DEVICE

Harry R. Tear, South Bend, Ind., assignor to The Lubrication Corporation, South Bend, Ind., a corporation of Delaware Application May 10, 1932, Serial No. 610,509

4 Claims. (Cl. 103—37)

This invention relates to improvements in lubricating devices and more particularly to pressure feed lubricant pumps utilizing a substantially continuously operating pump drive.

Lubricant pumps used in supplying lubricant under considerable pressure to lubricant receiving nipples or fittings through quick detachable couplers or nozzles, must be capable of delivering any quantity (large or small) of lubricant more or less instantaneously. In many cases it is not practical to provide the large amount of power necessary to develop a high pressure at the coupling or nozzle immediately upon starting the pump, nor is it practical to depend on the operator to cut off the power or pump in time to prevent bursting pressures from building up in the conduit through which the lubricant is conducted to the coupler or nozzle. Consequently it has been found desirable to resort to a substantially continuously running motor-pump construction and to provide some arrangement to prevent the pump from building up excessive lubricant pressure between service applications. Various schemes have been proposed but all have been wasteful of energy or have been otherwise inefficient or they have been partially or wholly ineffective.

Included among the schemes proposed in the prior art is apparatus wherein a pressure controlled by-pass is employed for returning lubricant from the pump cylinder to the reservoir. Another scheme proposed is that of driving the pump plunger through a spring connecting the plunger and the driving means so that the spring may yield upon a predetermined developed pressure and thus render the driving means ineffective to operate the plunger. Both of these methods possess the serious disadvantage of imposing upon the motor or driving means the predetermined maximum load so long as the driving means is in operation between service applications.

An object of the invention is to provide a lubricant pump wherein the effective piston displacement of the pump may be controlled for any given developed lubricant pressure.

A further object is to provide a pressure feed lubricant pump in which the effective piston displacement decreases automatically as the pressure within the pump and feeder lines increases.

Another object is to provide a pressure feed lubricant pump wherein a portion of the thrust applied to the pump piston during the pressure stroke is returned during the retractile stroke of the pumping cycle.

A still further object is to provide, in a pressure feed lubricant pump, means for automatically closing the lubricant inlet of the pump upon the development of a predetermined maximum pressure within the pump cylinder.

Other objects, the advantages and uses of the invention, will be, or should become apparent after reading the following description and claims and after consideration of the accompanying drawing forming a part of this specification, in which:

Fig. 1 is a side elevation of a complete pressure feed lubricant apparatus of the floor type incorporating the features of my invention;

Fig. 2 is a sectional view of the lubricant pump, with the parts in their normal operative positions;

Fig. 3 is a view similar to Fig. 2 illustrating the parts in the positions assumed subsequent to the building up of a predetermined maximum lubricant pressure.

In general the pressure feed lubricant pump selected for illustration herein, comprises, a lubricant reservoir A, a pump inlet port B communicating with a cylindrical chamber C within which a pump cylinder assembly D is mounted for reciprocation and normally restrained by an adjustable compression spring E, a piston F having a fixed stroke, pressure responsive means G associated with the cylinder assembly D for shifting the assembly within the chamber C upon the increase of pressure within the pump cylinder and feeder lines, a lubricant discharge port H for the pump and driving mechanism J for the piston F.

In Fig. 1 I have shown the pump incorporated in a semi-portable lubricant feeder apparatus including a carriage 2 having wheels 3 whereby the apparatus may be moved along the floor of the service station or room in which it is employed. The body 4 of the pump is supported upon the carriage 2 and provided with an upwardly extending externally threaded projection 5 through which the pump inlet port B is formed. The projection 5 protrudes through an opening 6 in the bottom wall of the reservoir A and a lubricant tight seal between the reservoir and body 4 is established by means of a lock nut 7 and a sealing washer 8 as shown. The driving mechanism J comprises, an electric motor 9 connected through a gear and pinion 10 and 11 respectively to a crank pin 12 which in turn is coupled by a connecting rod 13 to the piston F of the pump.

The piston F is slidably disposed within the cylinder bore 14 of a cylinder block 20 forming a part of the assembly D. Communication between the lubricant inlet port B and the cylinder bore 14 is established through an annular groove 15 formed in the outer wall of the block 20 and connected by passages 16 with the bore 14. The cylinder assembly D is normally held in that position illustrated in Fig. 2 by the restraining spring E so that the groove 15 of the block 20 is in exact registration with the inlet port B. Means for limiting the forward movement of the cylinder assembly D in the chamber C under influence of the spring E comprises a shoulder 4a formed in the forward end of the bore comprising the chamber C.

The mechanism G for causing the cylinder to move away from the piston F as pressure developed by the pump approaches its predetermined maximum limit comprises, a differential piston 17 secured to and spaced apart from the adjacent end of the cylinder block 20, the end of the block 20 serving as the coacting differential piston. The piston 17 is formed with an integral centrally located and forwardly extended tubular member 18 by which it may be secured, as by threaded engagement 19, to the adjacent end of the cylinder block. The piston 17 is disposed within a portion 21 of enlarged diameter of the chamber C. A sleeve 22 is located about the tubular member 18 and provided with an inwardly extending flange 23 at its forward end contacting the outer side wall of the member 18 and with an outwardly extending flange 24 at its rearward end. Piston packings, which may be in the form of leather cup washers 25 and 29, are provided for the piston 17 and for the adjacent end of the cylinder block 20, respectively, and held in place by interposing the cup washers between the flanged ends of the sleeve 22 and the adjacent end walls respectively of the piston and the block.

The cylinder bore 14 communicates with the interior of the tubular member 18 through an enlarged portion 26 formed in the bore 14 within which a spring pressed check valve 27 of the ball type is disposed. The ball of the valve 27 has for its seat the shoulder 28 formed between the bore 14 and the enlarged portion 26 thereof. Substantially aligned openings 31 and 32 are provided in the side walls of the members 18 and 22 respectively to permit lubricant to flow from within the member 18 to the annular space surrounding the sleeve 22 between the differential piston packings 25 and 29, so that lubricant may flow from the pump cylinder through the discharge port H regardless of the position of the cylinder assembly D within the chamber C. Packing comprising a leather cup washer 33 is provided for the forward end of the cylinder block 20 and held in place by an internally threaded ring 34 disposed upon an externally threaded reduced portion 35 formed on the forward end wall of the cylinder block about the mouth of the bore 14.

The rearward end of the chamber C is closed by a plug 37 having an externally threaded portion 38 engageable with an internally threaded portion 39 of the chamber C forming an adjustable support for the spring E by means of which the effective piston displacement of the piston F may be controlled for a given development pressure. In order to facilitate adjustment of the plug 37 to alter the compression of the spring E, a knurled flange 41 is formed on the outer side walls of the plug. A lock nut 42 is provided for locking the plug in place subsequent to adjustment.

Assuming that the discharge port H of the pump is connected as through a lubricant conducting hose 44 and discharge nozzle 45 with a lubricant receiving fitting wherein the resistance to the passage of lubricant therethrough and to the parts to be lubricated is relatively low, and that the motor 9 through the gear and pinion drive is actuating the pump piston F, the pump parts will assume the positions shown in Fig. 2. So long as the resistance to the passage of lubricant through the discharge port H, the lubricant conducting line, lubricant receiving fittings and parts to be lubricated remains of an order sufficiently low to permit the passage of lubricant therethrough under pressures developed within the pump cylinder 14 less than that required to resist the restraining spring E there will be no change in the position of the pump parts. Reciprocation of the piston F may force lubricant through the ball check valve 27 through the central bore of the member 18, the substantially alinged openings 31 and 32 in the members 18 and 22 respectively and the discharge port H.

If now the resistance to the discharge of lubricant from the pump becomes increased it is obvious that greater lubricant pressure will be necessary to force lubricant therethrough. As the pressure developed by the piston F in the cylinder bore 14 is built up the differential forces acting upon the piston 17 and the end of the cylinder block 20 will cause the entire cylinder assembly D to move forwardly against the force of the spring E. Inasmuch as the stroke of the piston F is fixed, the forward movement of the cylinder assembly D will decrease the effective piston displacement, and therefore the amount of lubricant forced through the discharge orifice H during each stroke will proportionally decrease. During the rectractile movement of the piston F the spring E will return force applied thereto by the forward movement of the cylinder assembly D during the pressure stroke of the piston so that the loss encountered through overcoming the restraining force of the spring E is minimized.

If now the resistance to the passage of lubricant through the discharge port H and the interconnected lubricant receiving fitting and parts to be lubricated should increase an amount sufficient to require lubricant pressure within the cylinder 14 sufficient to urge the cylinder assembly D forwardly against the spring E, a degree considerably greater than that previously described, the pump parts may ultimately assume the position as indicated in Fig. 3 wherein the annular groove 15 is moved entirely out of registration with the lubricant inlet port B thus depriving the pump cylinder of its lubricant charge. The position of the groove 15 in the cylinder block 20 is so arranged as to cause this condition to take place simultaneously with the registration of the forward edges of the passages 16 with the end 36 of the piston F at the limit of its pressure stroke, as shown in Fig. 3.

I have provided, therefore, in my improved pressure feed lubricant pump, automatic means for varying the effective piston displacement of the pump in proportion to the pressure developed in the pump cylinder so that the load imposed upon the driving mechanism J remains substantially constant throughout the feeding of lubricant under pressure therefrom, and wherein the load upon the driving mechanism J is substantially removed at such times as when resistance is encountered to the discharge of lubricant requiring a lubricant pressure greater than that capable of being developed by the pump. This predetermined maximum pressure by virtue of the pump construction may be predetermined by the operator by adjustment of the plug 37 to vary the compression of the spring E. In building the pump for various predetermined maximum pressure ranges the principal controlling factor is the spring E and the differential area of the piston 17 and cylinder block 20.

It is to be understood that the described embodiments of the invention herein set forth are presented for the purpose of illustration only and various changes may be made therein without departing from the spirit and scope of the invention.

I claim:

1. A lubricant pump comprising, a body, a pump cylinder stationary during normal pump operation but movable in said body under abnormal conditions, a piston mounted for reciprocation in said cylinder, said body having an inlet port therethrough, said cylinder having a passageway therethrough adapted to register with said inlet port when said cylinder is in one position in said body and to lie out of registration with said port when the cylinder is in another position in said body, and yieldable means for urging said cylinder to that position wherein registration between the passage and inlet port may be established.

2. In a lubricant feeder pump having a lubricant inlet port and a lubricant discharge port, a pump cylinder mounted for reciprocation, said cylinder having a lubricant inlet passageway adapted to register with said lubricant inlet port when said cylinder is in one position and adapted to lie out of registration with said inlet port when said cylinder is shifted to another position, yieldable means for urging said cylinder to that position for communication with said inlet port, a piston mounted for reciprocation in said cylinder, means for establishing communication between said discharge port and said pump cylinder regardless of the position of said cylinder inlet passage relative to said inlet port, and means responsive to lubricant pressure in said cylinder for shifting said cylinder against said yielding means as the lubricant pressure is increased.

3. A lubricant pump comprising, a body having a lubricant inlet port, a lubricant reservoir connected to said inlet port, a pump cylinder movable along its axis in said body and having an outlet and a lubricant inlet passageway adapted for registration with said inlet port, a piston mounted for reciprocation in said cylinder, yielding means for moving said cylinder in said body relative to said piston to that position to establish maximum effective piston displacement and for causing registration of said lubricant passageway with said lubricant port, and means responsive to lubricant pressure in said cylinder for moving said cylinder against said yielding means to vary the effective piston displacement and to cause said passageway to move out of registration with said lubricant inlet port when a maximum predetermined lubricant pressure is developed in said cylinder.

4. A pump comprising a body having an inlet and an outlet, a cylinder movably mounted in said body and having an outlet port for communication with said outlet and an inlet port communicating with said inlet in one position and out of communication therewith in another position, a piston having a constant stroke and reciprocable in said cylinder, means for urging said cylinder toward that position in which the inlet and inlet port communicate and fluid pressure means responsive to the pressure at the outlet for urging the cylinder toward that position in which the inlet and inlet port are out of communication.

HARRY R. TEAR.